United States Patent
Knudsen et al.

(10) Patent No.: US 7,013,729 B2
(45) Date of Patent: *Mar. 21, 2006

(54) HIGHLY SENSITIVE ACCELEROMETER

(75) Inventors: Sverre Knudsen, Trondheim (NO); Arne Berg, Kattem (NO); James R. Dunphy, South Glastonbury, CT (US); Daniel Woo, Missouri City, TX (US)

(73) Assignee: Weatherford/Lamb, Inc., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 10/933,132

(22) Filed: Sep. 2, 2004

(65) Prior Publication Data

US 2005/0076713 A1   Apr. 14, 2005

Related U.S. Application Data

(63) Continuation of application No. 10/366,900, filed on Feb. 14, 2003, now Pat. No. 6,789,424, which is a continuation of application No. 09/410,634, filed on Oct. 1, 1999, now Pat. No. 6,575,033.

(51) Int. Cl.
    *G01P 15/08* (2006.01)
(52) U.S. Cl. .................. 73/514.26; 250/227.14; 250/227.18
(58) Field of Classification Search ............ 73/514.26, 73/514.16, 514.01, 514.38, 514.23, 514.36, 73/653, 655, 657; 250/227.14, 227.17, 227.18; 356/477
See application file for complete search history.

(56) References Cited

U.S. PATENT DOCUMENTS

| | | | |
|---|---|---|---|
| 3,731,542 A | 5/1973 | Forsburg | |
| 4,322,829 A | 3/1982 | David, Jr. et al. | |
| 4,493,212 A | 1/1985 | Nelson | |
| 4,567,771 A | 2/1986 | Nelson et al. | |
| 4,589,285 A | 5/1986 | Savit | |
| 4,719,800 A * | 1/1988 | Moser | 73/514.26 |
| 4,893,930 A | 1/1990 | Garrett et al. | |
| 5,001,337 A | 3/1991 | Homuth | |
| 5,132,529 A | 7/1992 | Weiss | |
| 5,237,632 A | 8/1993 | Henning | |
| 5,276,322 A | 1/1994 | Carome | |
| 5,369,485 A | 11/1994 | Hofler et al. | |
| 5,390,155 A * | 2/1995 | Lea | 367/149 |
| 5,437,186 A | 8/1995 | Tschulena | |
| 5,497,233 A | 3/1996 | Meyer | |
| 5,864,099 A | 1/1999 | Wittrisch et al. | |
| 5,883,308 A | 3/1999 | Fersht | |

(Continued)

FOREIGN PATENT DOCUMENTS

DE    199 39 583    2/1999

(Continued)

*Primary Examiner*—Helen Kwok
(74) *Attorney, Agent, or Firm*—Patterson & Sheridan, L.L.P.

(57) ABSTRACT

A highly sensitive accelerometer for determining the acceleration of a structure includes a mass within a housing suspended by opposing support members. The support members are alternately wound around a pair of fixed mandrels and the mass in a push pull arrangement. At least a portion of one of the support members comprises a transducer capable measuring the displacement of the mass within the housing. An embodiment of the invention employs optical fiber coils as the support members for use in interferometric sensing processes. Arrays of such interferometer based accelerometers may be multiplexed using known techniques.

20 Claims, 9 Drawing Sheets

U.S. PATENT DOCUMENTS

| | | |
|---|---|---|
| 5,892,860 A | 4/1999 | Maron et al. |
| 5,903,349 A | 5/1999 | Vohra et al. |
| 5,911,158 A | 6/1999 | Henderson et al. |
| 6,072,567 A * | 6/2000 | Sapack ........................ 356/32 |
| 6,161,433 A | 12/2000 | Erath |
| 6,175,108 B1 * | 1/2001 | Jones et al. ............ 250/227.14 |
| 6,575,033 B1 | 6/2003 | Knudsen et al. |
| 6,789,424 B1 | 9/2004 | Knudsen et al. |

FOREIGN PATENT DOCUMENTS

| | | |
|---|---|---|
| EP | 0 419 173 | 3/1991 |
| WO | WO 98/35208 | 8/1998 |
| WO | WO 99/39214 | 8/1999 |

* cited by examiner

HIGHLY SENSITIVE ACCELEROMETER

CROSS REFERENCE TO RELATED APPLICATIONS

This application is a continuation of U.S. patent application Ser. No. 10/366,900 filed Feb. 14, 2003 now U.S. Pat. No. 6,789,424. U.S. patent application Ser. No. 10/366,900 is a continuation of application Ser. No. 09/410,634, filed Oct. 1, 1999 now U.S. Pat. No. 6,575,033. All of the above referenced patent applications are herein incorporated by reference in their entireties.

TECHNICAL FIELD

This invention relates to highly sensitive accelerometers, and more particularly to a fiber optic based accelerometer.

BACKGROUND ART

It is known to monitor the physical characteristics of structures and bodies using sensors. One such application is the monitoring of oil wells to extract such information as temperature, pressure, fluid flow, seismic, and other physical characteristics. The monitoring of oil wells presents certain challenges for conventional sensors because they must be placed in harsh environments (e.g., high pressures and temperatures). Historically, such monitoring has been dominated by the use of electronic sensors and optical sensors to a lesser degree.

Such conventional electrical sensors are limited for several reasons. The on-board electronics of such sensors must operate in a very hostile environment, which includes high temperature, high vibration, and high levels of external hydrostatic pressure. Such electrical sensors also must be extremely reliable, since early failure entails very time consuming and expensive well intervention. Electronics, with its inherent complexity, are prone to many different modes of failure. Such failures have traditionally caused less than acceptable levels of reliability when these electrical sensors are used to monitor oil wells.

There are numerous other problems associated with the transmission of electrical signals within well bores. In general, it is difficult to provide an insulated electrical conductor for transmitting electrical signals within well bores. Such electrical conductors are extremely difficult to seal against exposure to well bore fluids, which are at high temperatures, high pressures, and present a very corrosive environment. Such electrical conductors, once damaged by the fluids that penetrate the insulating materials around the electrical conductors, will typically short electrical signals. Additionally, electrical transmissions are subject to electrical noises present in some production operations.

It is typical to use an accelerometer to measure downhole seismic disturbances to determine the acoustic wave characteristics of underground layers in the proximity of the well bore. An accelerometer is generally a mass-spring transducer housed in a sensor case. The sensor case is coupled to a moving body, the earth, whose motion is inferred from the relative motion between the mass and the sensor case. Such accelerometers relate the relative displacement of the mass with the acceleration of the case, and therefore the earth in the proximity of the well bore. An array of accelerometers is typically placed along the length of a well bore to determine a time dependent seismic profile.

One prior art accelerometer is a piezoelectric based electronic accelerometer. The piezoelectric based electronic accelerometer typically suffers from the above-referenced problems common to electrically based sensors. In particular, most high performance piezoelectric accelerometers require power at the sensor head. Also, multiplexing of a large number of such sensors is not only cumbersome but tends to occur at a significant increase in weight and volume of an accelerometer array, as well as a decrease in reliability. Also, piezoelectric accelerometers operate poorly at the lowest frequencies in the seismic band.

It is also known to use optical interferometer accelerometers to measure the acceleration of certain structures, and that they can be designed with fairly high responsivities and reasonably low threshold detection limits. Some prior art types of fiber optic accelerometers include interferometric fiber optic accelerometers based on linear and nonlinear transduction mechanisms, circular flexible disks, rubber mandrels, and liquid-filled-mandrels. Some of these fiber optic accelerometers have displayed very high acceleration sensitivity (up to 104 radians/g), but tend to utilize a sensor design that is impractical for many applications.

For instance, sensors with very high acceleration sensitivity typically often have a seismic mass greater than 500 grams. This seriously limits the frequency range in which the device may be operated as an accelerometer. The devices are so bulky that their weight and size renders them useless in many applications. Other fiber optic accelerometers suffer either from high cross-axis sensitivity or low resonant frequency, or require an ac dither signal, and tend to be bulky (>10 kg), expensive, and require extensive wiring and electronics. Even optical interferometers designed of special materials or construction are subject to inaccuracies because of the harsh borehole environment and the very tight tolerances present in such precision equipment.

For many applications, the fiber optic sensor is expected to have a flat frequency response up to several kHz (i.e., the device must have high resonant frequency) and high sensitivity. For many applications, the fiber optic sensor must be immune to extraneous measurands (e.g., dynamic pressure) and must have a small foot print and packaged volume that is easily configured in an array (i.e., easy multiplexing).

SUMMARY OF THE INVENTION

Objects of the present invention include provision of a fiber optic accelerometer for use within a harsh environment.

The invention may be used in harsh environments (high temperature, and/or pressure, and/or shock, and/or vibration), such as in oil and/or gas wells, engines, combustion chambers, etc. In one embodiment, the invention may be an all glass fiber optic sensor capable of operating at high pressures (>15 kpsi) and high temperatures (>150° C.). The invention will also work equally well in other applications independent of the type of environment.

It is an object of the present invention to provide a highly sensitive linear accelerometer for sensing acceleration in a predetermined direction. The accelerometer is comprised of a rigid housing with a mass suspended therein by at least two elastic support members. The at least two elastic members are axially aligned in the predetermined direction, are attached to opposite ends of the housing, and are further attached to the mass. At least a portion of one of the elastic support members comprises a transducer capable of measuring a displacement of the mass within the housing in response to acceleration along the predetermined direction. Certain embodiments include a pair of fixed mandrels rigidly attached to opposite ends of the housing, and the mass comprises at least one floating mandrel wherein the elastic support members are each wrapped around one of the fixed mandrels and the floating mandrel.

It is another object of the present invention to provide a linear accelerometer where the mass comprises a pair of floating mandrels and wherein each elastic support member is wrapped about one of the fixed mandrels and one the floating mandrels. In another embodiment the mandrels and the mass of the accelerometer comprise a toroidal shape.

It is yet another object of the present invention to provide a linear accelerometer where at least one of the elastic support members comprises an optical fiber coil. The movement of the mass induces in the optical fiber coil a variation in length corresponding to the movement, allowing for interferometric measurement to determine the variation in length of the fiber.

It is still another object of the present invention to provide a linear accelerometer having an axial alignment assembly attached to the mass. The axial alignment assembly limits movement of the mass in a direction perpendicular to the predetermined direction. The axial alignment assembly comprises a flexure member attached to the mass and the housing. The flexure member allows axial movement of the mass in the predetermined direction and limits non-axial movement of the mass. In one embodiment, a pair of alignment assemblies are employed where the flexure member is a diaphragm positioned on an alignment rod and the diaphragm is captured within a bore in the housing about their outer periphery. Another embodiment provides for a bore positioned in the fixed mandrels for capturing the diaphragms. In another embodiment, the flexure member comprises a thin flexible plate and at least one pair of the flexure members are attached to the mass and to the housing.

It is still further an object of the present invention to provide a linear accelerometer where the transducer comprises a strain sensing element including a fiber optic strain sensor, a piezo electric device, a PVDF material, or a resistive strain gauge.

It is another object of the presenting invention to provide a highly sensitive linear accelerometer for sensing acceleration in a predetermined direction. The highly sensitive linear accelerometer has a rigid housing, a mass, a pair of fixed mandrels, two pairs of elastic support members, and a pair of axial alignment assemblies. The mass has an elongated body and rounded ends. The pair of fixed mandrels is rigidly attached to the housing and defines a predetermined distance therebetween. The two pairs of elastic support members are axially aligned in the predetermined direction and are wrapped around the fixed mandrels and the rounded ends in a continuous fashion to suspend the mass within the housing. At least a portion of one of the elastic support members comprises a transducer capable of measuring a displacement of the mass within the housing in response to acceleration along the predetermined direction. The pair of axial alignment assemblies is attached to the mass and limits movement of the mass in a direction perpendicular to the predetermined direction.

It is yet another object to provide a linear accelerometer where the fixed mandrels and the mass are comprised of a toroidal shape.

It is still another object of the present invention to provide an apparatus for vertical seismic profiling of an earth borehole having an x-direction, a y-direction, and a z-direction orthogonal to each other. The apparatus includes an optical fiber transmission cable and includes a plurality of linear accelerometers coupled to the borehole and in optical communication with the optical fiber transmission cable. The plurality of linear accelerometers are positioned in each of the three orthogonal directions. Each of the linear accelerometers is a highly sensitive linear accelerometer for sensing acceleration in a predetermined one of the directions. Each accelerometer includes a rigid housing, a mass, and at least two elastic support members. The at least two elastic support members are comprised of optical fiber axially aligned in the predetermined direction and attached to opposite ends of the housing and further attached to the mass. The elastic support members suspend the mass within the housing. At least a portion of one of the elastic support members comprises a transducer capable of measuring a displacement of the mass within the housing in response to an acceleration along the predetermined direction. The transducer is capable of providing a respective sensing light signal indicative of static and dynamic forces at a respective accelerometer location. The apparatus also includes an optical signal processor connected to the optical transmission cable for providing seismic profile information based on the respective sensing light signal.

BEST MODE FOR CARRYING OUT THE INVENTION

Figure 1:
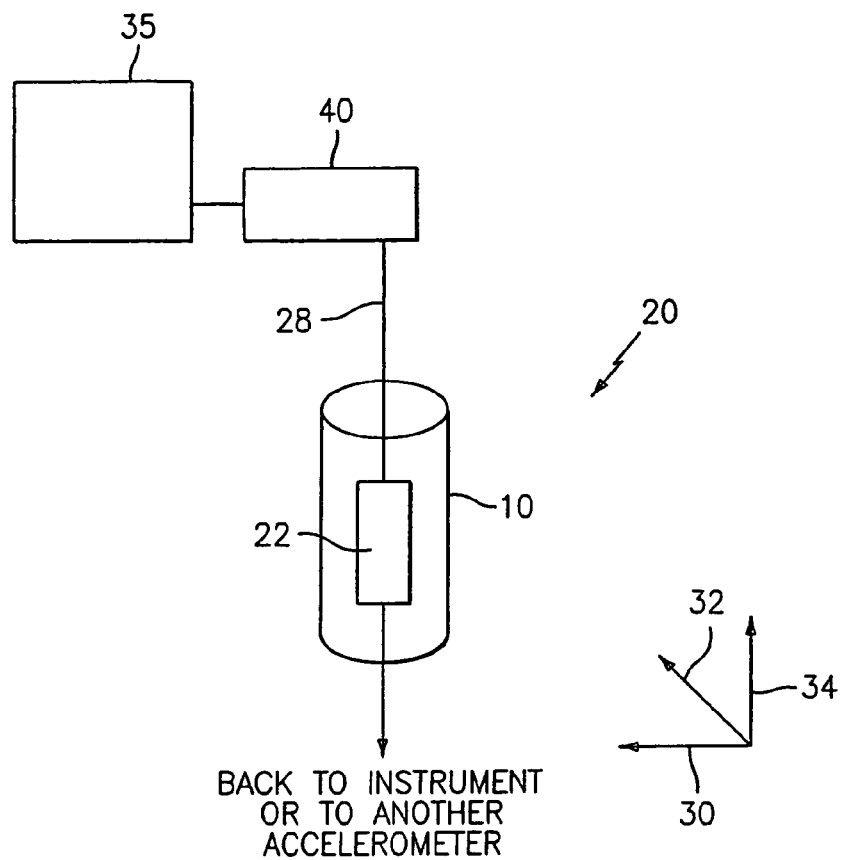
FIG. 1 is a schematic diagram of an acceleration monitoring system incorporating a highly sensitive accelerometer in accordance with the present invention.

Referring to FIG. 1, a structure 10 may be subjected to a hostile environment, such as an oil or gas well borehole, building, bridge, aircraft, or pump; or the structure 10 may be a structure or component subjected to acceleration and wishing to be interrogated. The structure 10 has coupled to it at least one highly sensitive accelerometer 22, as will be more fully described herein below. Highly sensitive accelerometer 22 is part of a transmission cable string 20 connected by a transmission cable 28 to a signal converter 40 and signal processing equipment 35. The acceleration of structure 10 in any of the three axes 30, 32, 34 is detected by accelerometer 22, depending on the orientation of the accelerometer, as will be more fully described herein. The signal processing equipment 35 may comprise any known instrumentation for processing electrical, electro-optic, or optical signals of the various embodiments of the present invention.

In a particular embodiment of the present invention, accelerometer 22 is mounted within a hermetically sealed vessel (not shown). The accelerometer 22 is disposed in a harsh environment having a high temperature (up to about 175 degrees C.), a high pressure (up to about 20 kpsi), a high EMI environment, or is disposed in any non-harsh environment where a highly sensitive accelerometer is needed. In one embodiment, accelerometer 22 may comprise a fiber optic based device, and transmission cable 28 may comprise an environmentally hardened capillary tube, such as that disclosed in commonly owned, copending U.S. patent application Ser. No. 09/121,468, entitled "Optical Fiber Cable for Use in Harsh Environments," filed Jul. 23, 1998 in the name of Bonja, the disclosure of which is incorporated herein in its entirety.

The transmission cable 28 is routed to accelerometer 22. The transmission cable 28 provides for the delivery of communication signals between the signal processing equipment 35 and the accelerometer 22. The transmission cable 28 is connected therebetween either directly or via interface equipment (not shown) as required. The accelerometer 22 is closely coupled to the structure 10 by bolting, clamping, or other known methods.

Accelerometer 22 of the present invention may be used, for example, as a single device to monitor structure 10 directly or may comprise an array of similar such accelerometers. In one embodiment, an array of accelerometers 22 may be coupled to a structure 10 to determine the structure's response to the surrounding environment. For example, the array of accelerometers 22 may perform vertical seismic profiling distributed over a known length.

Figure 2:
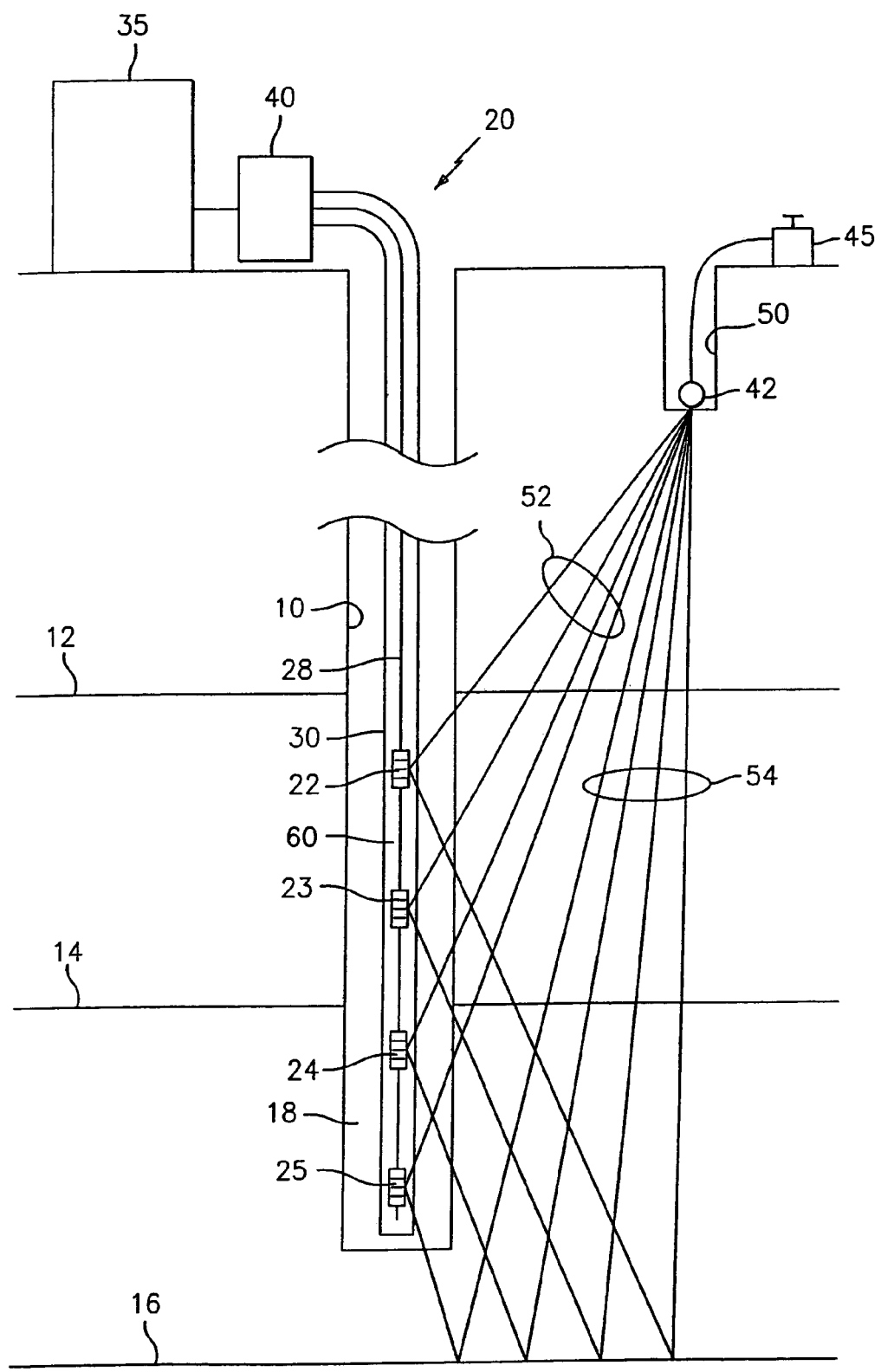
FIG. 2 is a cross-sectional view of an earth borehole having an array of accelerometers of the present invention deployed therein for vertical seismic profiling.

Referring to FIG. 2, structure 10 may be any structure, such as a casing or production pipe coupled to a borehole within an oil or gas well and penetrating various earth layers 12, 14, 16. Such a borehole may be fifteen to twenty thousand feet or more in depth. As is known in the art, the borehole is filled with a drilling fluid 18 having a high temperature and pressure, which presents an extremely corrosive and hostile environment.

Transmission string 20 includes an array of accelerometers 22, 23, 24, 25 as described above connected by transmission cable 28, which may comprise an optical fiber positioned within a capillary tube. The accelerometers 22, 23, 24, 25 may comprise a single accelerometer or may comprise two or three linear accelerometers 22 of the present invention. The accelerometers 22, 23, 24, 25 may be positioned in any of the three axes 30, 32, 34 (FIG. 1) and may transmit respective sensing light signals indicative of static and dynamic forces at the respective accelerometer location.

The array of accelerometers 22, 23, 24, 25 is useful for performing vertical seismic profiling with the optical fiber sensors distributed over a known length, such as 5000 feet. Over the known length, the accelerometers 22, 23, 24, 25 are evenly spaced at a desired interval, such as every 10 to 20 feet, for providing the desired vertical seismic profiling. As described in greater detail herein, each accelerometer includes fiber optic sensors that reflect a narrow wavelength band of light having a central wavelength. Each accelerometer operates at a different wavelength band and central wavelength such that the signals may be easily detected using Wavelength Division Multiplexing (WDM) techniques, which can also easily be separated in time using TDM.

The entire optical fiber, positioned within the transmission cable 28, is lowered to a desired depth, for example, 1,000 feet as measured from the upper most sensor. An acoustic wave source, such as a small charge of dynamite 42 (a seismic shot), is detonated by a blaster 45 in a shallow shothole 50 that is offset from the borehole 10 by a selected distance, such as 3,000 feet.

Still referring to FIG. 2, acoustic waves radiate from the shot along a direct path 52 and a reflected path 54. The waves of the path 54 are reflected off of the various earth layers 12, 14, 16. As will be described in greater detail hereinafter, the direct seismic waves 52 and reflected seismic waves 54 cause the surrounding earth layers 12, 14, 16 to react. The motion of the earth is detected by the accelerometers 22, 23, 24, 25 through structure 10 coupled to the earth.

Resulting data signals are transmitted through the transmission cable 28 to the demodulator 40 and optical signal processing equipment 35. In one embodiment of the invention, after the seismic shot, the transmission cable string 20 is repositioned within the borehole for additional seismic profiling. In another embodiment of the invention, the accelerometers 22, 23, 24, 25 are distributed over the entire length of the transmission cable 28 such that the entire borehole 10 is characterized in a single shot.

In an array of accelerometers of the present invention, each accelerometer operates at a different wavelength band and central wavelength such that the signals may be easily detected using Wavelength Division Multiplexing (WDM) techniques. Signal processing equipment 35 and signal converter 40, which may comprise one or more demodulators, interpret the wavelength phase change from the return signals.

Figure 4:
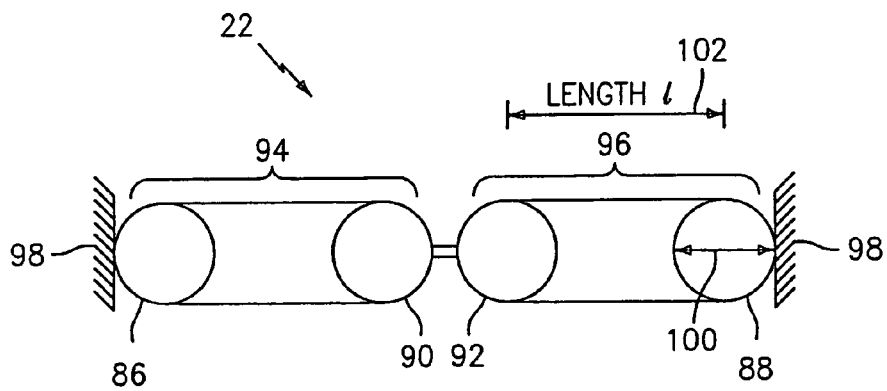
FIG. 4 is a side view of a schematic representation of an accelerometer in accordance with the present invention.
Figure 5:
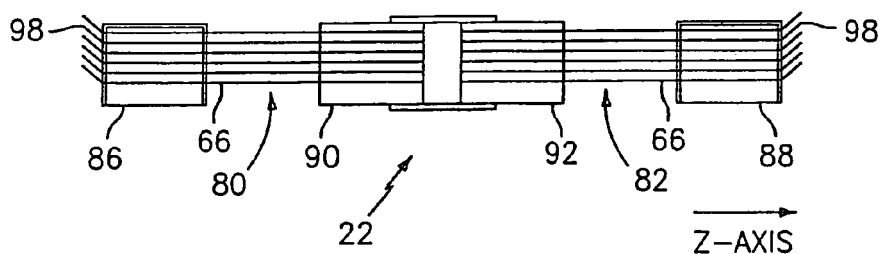
FIG. 5 is a top view of a schematic representation of the accelerometer of FIG. 4 in accordance with the present invention.

Referring to FIGS. 4 and 5, a side view and a top view of an embodiment of accelerometer 22 are schematically illustrated. The accelerometer 22 includes a mass having floating mandrels 90 and 92. The accelerometer 22 includes a housing 98 having a first, fixed mandrel 86 at one end and having a second, fixed mandrel 88 at another end. A first elastic support member 80, which may be a coil or wrap 94 of optic fiber 66, is attached to the floating mandrel 90 and the first, fixed mandrel 86. A second elastic support member 82, which may be a coil or wrap 96 of optic fiber 66, is attached to the floating mandrel 92 and the second, fixed mandrel 88. The elastic support members 80 and 82 suspend the mass within the housing 98.

A number of performance deficiencies in the prior art are addressed by accelerometer 22 in accordance with the present invention. For instance, for fiber optic based embodiments, the lowest resolvable or measurable acceleration will be limited by the detection noise floor of the interferometer, which is configured around the optical fiber coils 94 and 96 in conjunction with the phase measurement scheme and the scale factor of the accelerometer mechanism. For instance, in seismic applications, though the present invention is not limited to such, accelerometer 22 is required to detect accelerations as low as 10–100 nG/$\sqrt{Hz}$ in the 1 Hz to 2 Hz frequency band.

Figure 12:
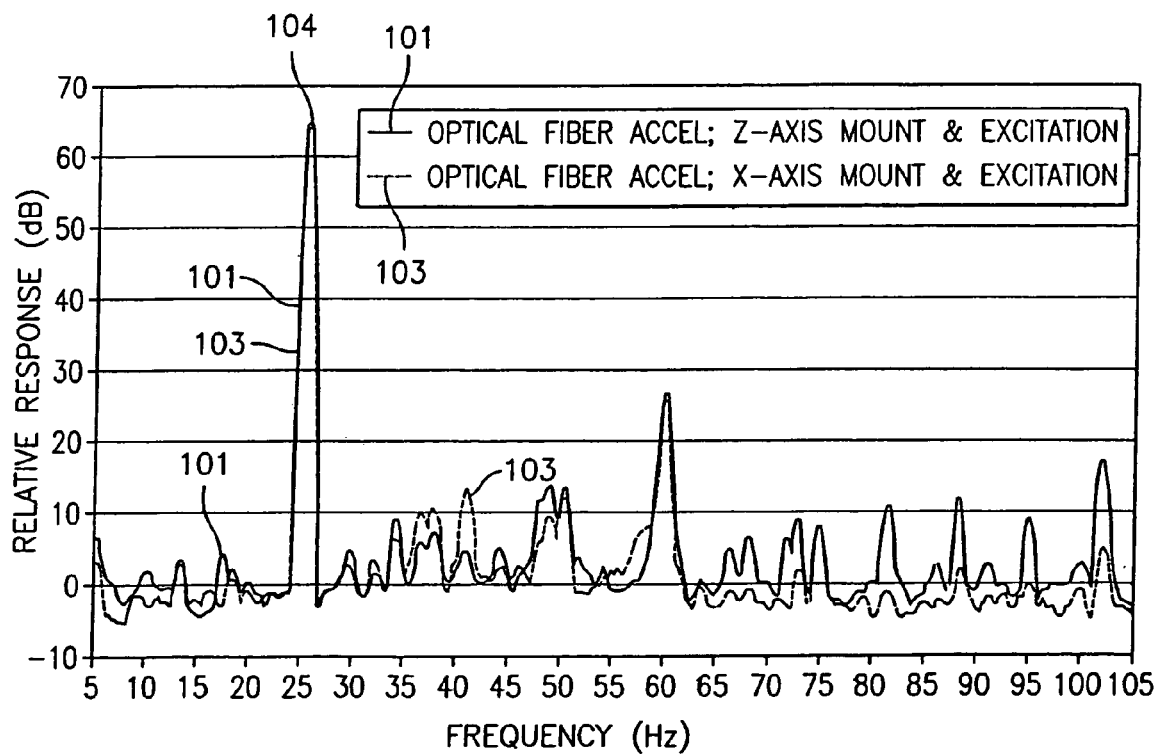
FIG. 12 is a graphical representation of the response of an embodiment of the present invention to a test signal.

Furthermore, it is well known that high performance interferometers and phase measurement systems can detect phase shifts as low as 10 to 100 microrad/rtHz or better. The optical fiber coils 94 and 96 of the support members 80 and 82 of an interferometer with an associated phase measurement system yield an accelerometer sensitivity or scale factor of about 1 krad/G or higher to achieve measurements with the indicated noise floor. (FIG. 12 is an example of a typical test signal which shows the noise floor according to an embodiment of the present invention).

Accelerometer 22 may be fabricated with scale factors of between 500 and 5000 krad/G that covers the range of scale factors, as detailed herein below, necessary to use this accelerometer in seismic applications. As previously noted, interferometer measurement systems exhibit scale factors that increase with increased fiber length. As best shown in FIG. 5, the fixed mandrels 86, 88 and floating mandrels 90, 92 are used to create multiple coil turns of fiber 66 in each elastic support member 80 and 82, thereby enabling a small package for an accelerometer with high scale factor.

In this accelerometer 22, the effective scale factor can be described in terms of the strain applied to the fibers 66 by the moving mass of the floating mandrels 90 and 92. It should be noted that the scale factor is proportional to the mass of the design and is inversely proportional to the cross sectional area of the supporting coil 94 or 96 of fiber 66. As shown in the spring-mass acceleration model of the prior art in FIG. 3, if the length of the fiber 66 of an interferometer 62 is increased, the sensitivity is normally also increased. However, the supporting fibers 66 of the present accelerometer 22 consist of a number of turns in the suspension coil 94 or 96. If the length of the fiber 66 is increased, the number of turns to create the suspension coil 94 or 96 is also increased, and the total fiber cross sectional area of the suspension coil 94 or 96, therefore, is increased. The effect is to make the scale factor approximately independent of total fiber length.

The range of accelerometer 22 can be limited by one of two factors. For instance, if the phase measurement system has a limited range, then large accelerations cannot be interpreted. However, current phase demodulator technology, as typified by Optiphase model OPD-200, produced and sold by Optiphase, can track phase changes over many $2\pi$ cycles, which removes this phenomenon as a limitation.

The other potential limitation might be the mechanical strength of the fibers 66. The present invention has been reviewed with respect to the mechanical implications of large acceleration changes imposed on the suspension coils 94 and 96. It is useful to realize that even at very high shock conditions, for example as high as 200 Gs, the transient load is shared by all of the fibers 66 in the coil 94 or 96. In such a situation, the maximum load applied to any filament 66 in the coil 94 or 96 can be much less than 0.1% of the ultimate strength of the glass filament 66. This load sharing ability is a benefit of the accelerometer of the present invention, which demonstrates inherent durability and a large acceleration range capability.

A typical approach for accelerometer design is to define the operating bandwidth to be the flat signal response spectral region below the first structural resonance of the suspended mass. In the case of accelerometer 22, it is important to keep in mind that the stiffness of the coils 94 and 96 has an impact on the resonant frequency. In is important also to keep in mind that the total glass cross sectional area of the coils 94 and 96 relative to the accelerometer mass must be considered when designing the fundamental resonant frequency.

Figure 13:
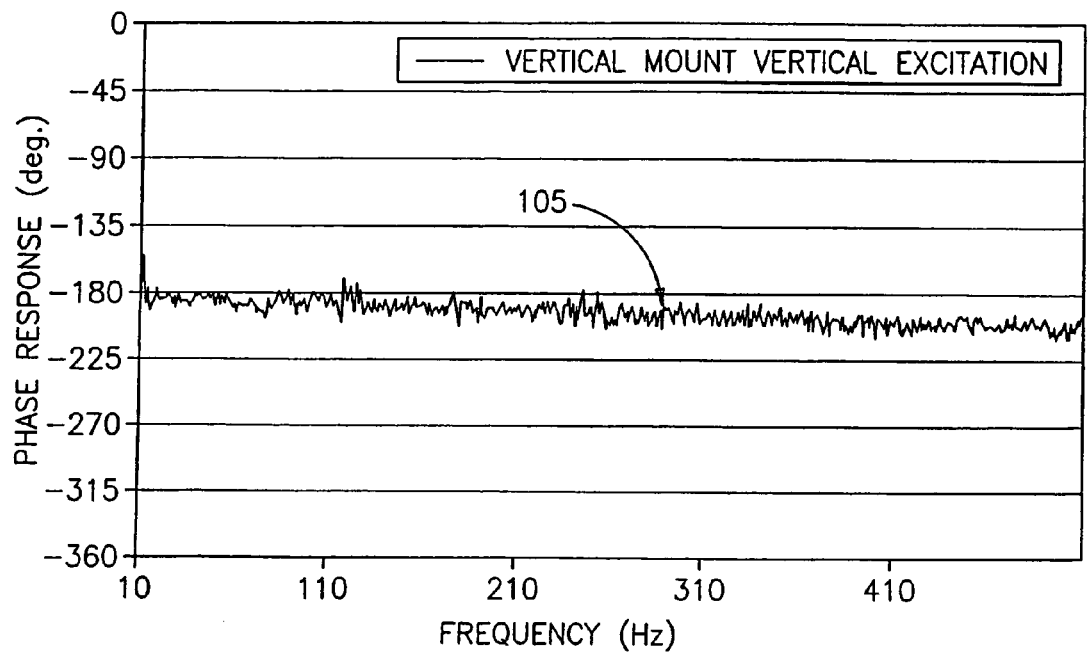
FIG. 13 is a graphical representation of the phase response of the embodiment of FIG. 12.
Figure 14:
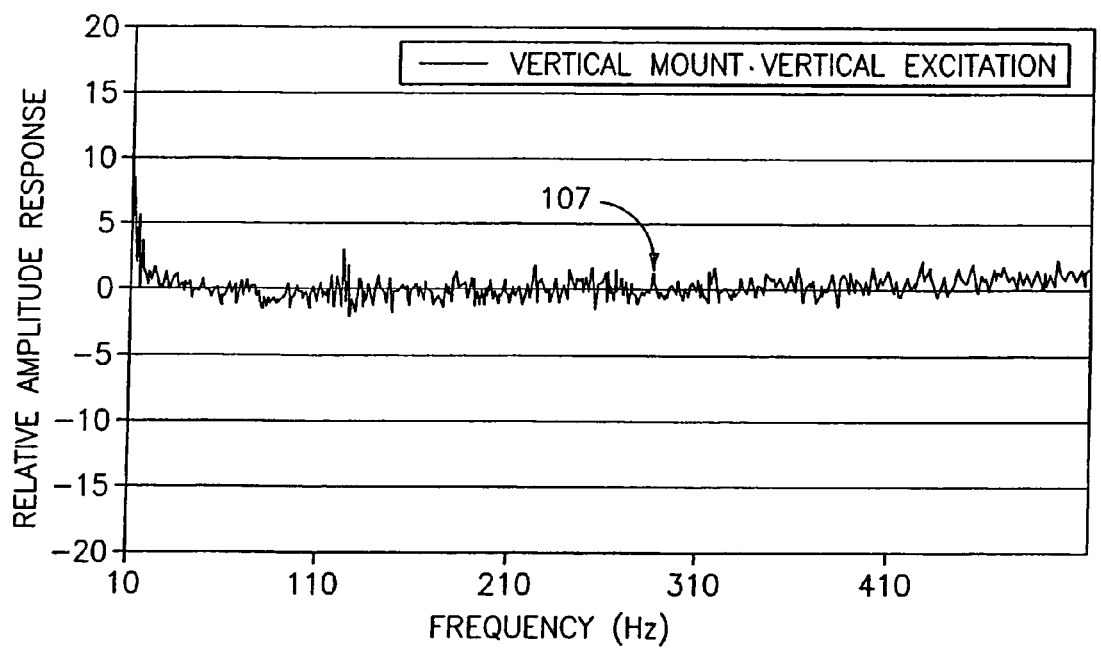
FIG. 14 is a graphical representation of the amplitude response of the embodiment of FIG. 12.

It has been discovered that an adequate scale factor can be achieved while maintaining the system resonance above 1 kHz. This discovery enables the present invention to satisfy many seismic transducer application requirements. Examples of both the amplitude and phase response of a typical device are shown in FIGS. 13 and 14, which verifies the ability of the accelerometer of the present invention to achieve high resonant frequencies while achieving good sensitivity. Embodiments of accelerometer 22 make it practically insensitive to position with respect to gravity as will be shown in greater detail below.

Figure 3:
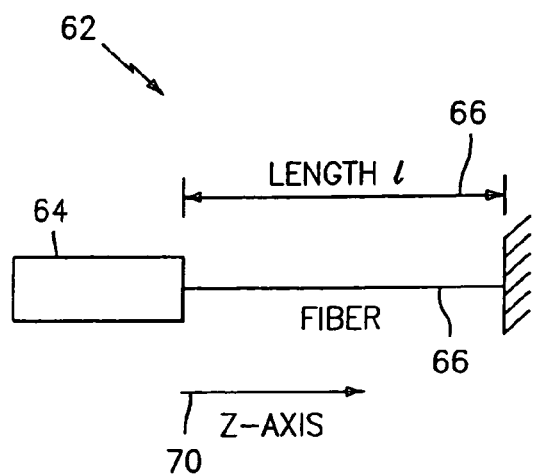
FIG. 3 is a schematic diagram of a spring mass acceleration model of the prior art.

In practice, it is generally not practical to use long fiber length l in a single strand as shown in the prior art of FIG. 3. As such, the present invention uses multiple windings or wraps 94 and 96 of fiber 66 to obtain a long effective fiber length as best shown with reference to FIG. 4. The windings 94 and 96 of fiber optic accelerometer 22 each comprise N turns of fiber 66 coiled around a fixed mandrel 86, 88 and around a second active mandrel 90, 92 that is free and used to strain the fiber 66 by its own mass.

The fixed mandrels 86, 88 may be grounded to a housing represented by 98, and the active mandrels 90, 92 may be restrained from movement normal to an axial direction represented by arrow 70. When housing 98 is subjected to motion in the axial direction 70, the acceleration associated with that motion is detected by transducers or sensor coils 94, 96 in a manner similar to the mass/spring system of FIG. 3.

A single sensor coil 94 or 96 could be used to measure acceleration in the axial direction 70. However, the push-pull or differential arrangement of the pair of sensor coils 94 and 96 (in an interferometer, for example) provides mechanical symmetry which lowers total harmonic distortion and cross axis sensitivity. Mechanical symmetry could also be achieved by replacing one of the sensor coils 94 or 96 with another material having a similar spring rate as the spring constant of the fiber turns. The active mandrels 90, 92 are suspended between at least one pair of springs or elastic support members 80 and 82, at least a portion of one of which is a strain sensing element or sensor coil 94 or 96, preferably comprised of optical fibers 66.

In alternative embodiments, one of the pairs of sensor coils 94 or 96 may either be used as a dummy arrangement to create mechanical symmetry in the axial direction 70, as a back-up arrangement in the event that one of the sensor coils 94 or 96 fails, or as a secondary sensor coil in a push-pull or differential arrangement. The latter effectively doubles the accelerometer scale factor.

Any known optical fiber 66 may be used having various diameters. However, the diameter of the fiber 66 is important to the performance as well as the durability and reliability of the accelerometer 22. For example, an optical fiber having a relatively large diameter has a minimum bend radius to ensure a predictable lifetime without failure. If a large diameter fiber is used, a commensurately large mandrel diameter 100 should be used to accommodate the fiber for reliability reasons. However, as mandrel diameter 100 grows, so too does the overall volume of accelerometer 22.

Figure 6:
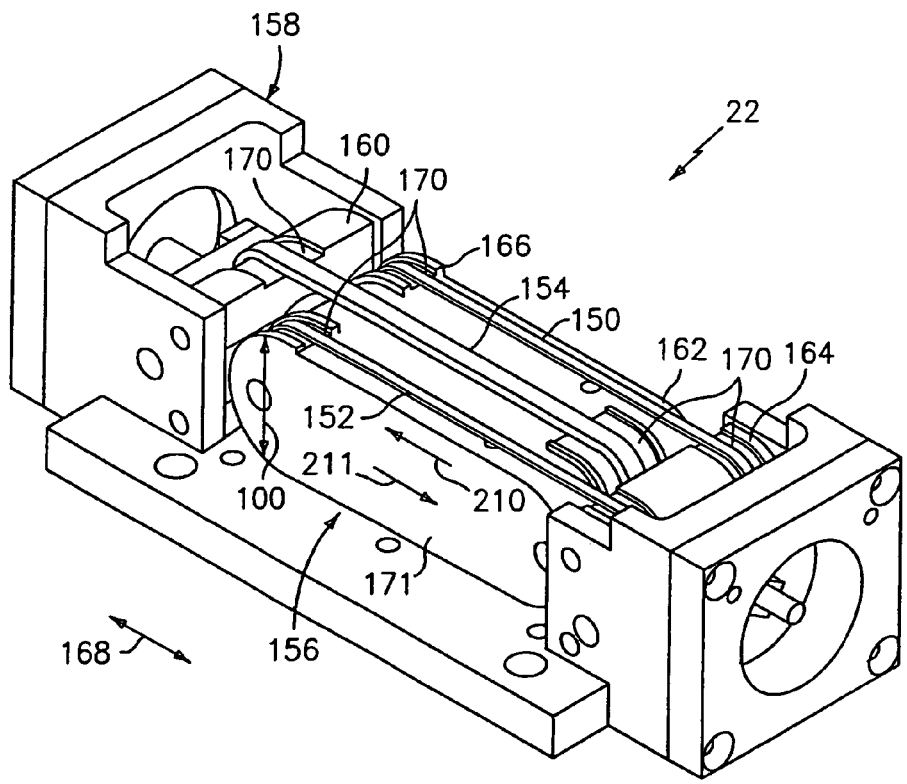
FIG. 6 is a perspective view of an embodiment of the accelerometer of the present invention.
Figure 7:
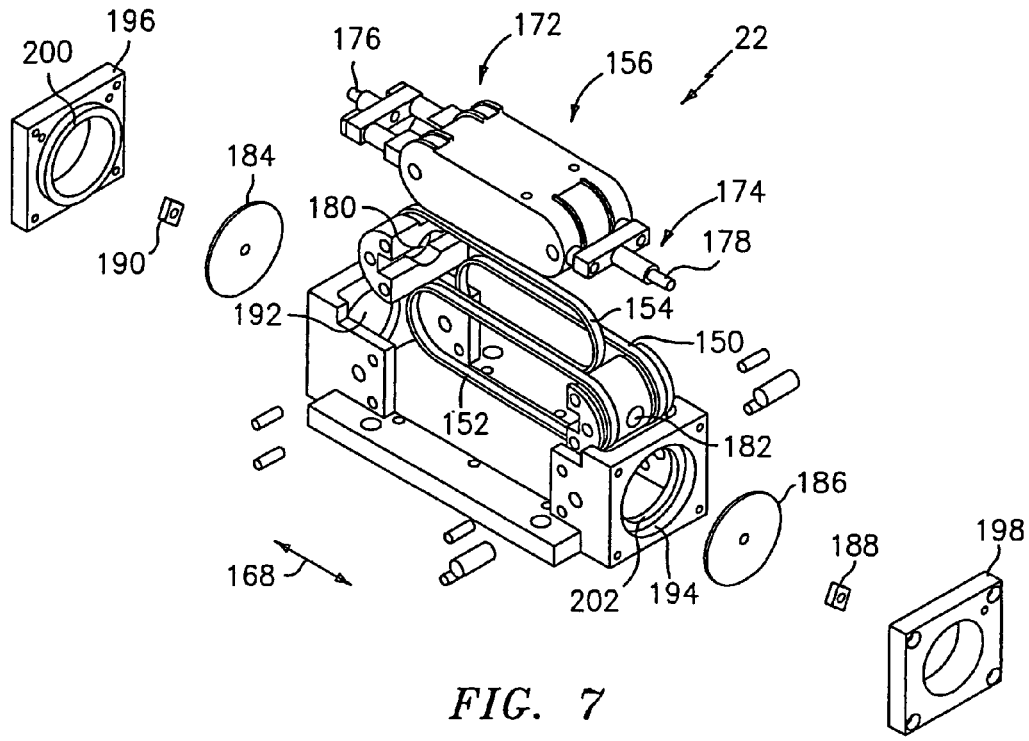
FIG. 7 is an exploded perspective view of the accelerometer of FIG. 6 showing the axial alignment assemblies.

Referring to FIGS. 6 and 7, an embodiment of an accelerometer 22, as described above, is illustrated in accordance with the present invention. In FIG. 6, a perspective view of the accelerometer 22 is shown; and in FIG. 7, an exploded view of the accelerometer 22 is shown. The accelerometer 22 includes a mass 156 and a housing 158. The housing includes fixed mandrels 160 and 164. The mass 156 includes mandrel ends 162 and 166.

The accelerometer 22 includes three elastic support members 150, 152, and 154, which are comprised of windings of optical fibers, although other elastic support members could be employed without deviating from the present invention. The first and second elastic support members 150, 152 combined are comprised of the same length of fiber as the third elastic support member 154. The elastic support members 150, 152, and 154 cooperate in a push-pull arrangement to suspend mass 156 within housing 158. The wraps of the third support 154 are wound in a continuous fashion about fixed mandrel 160 rigidly attached to housing 158 and mandrel end 162 of mass 156. Similarly the wraps of the first and second support members 150 and 152 are wound in a continuous fashion about fixed mandrel 164 rigidly attached to housing 158 and mandrel end 166 of mass 156.

The first support member 150 and the second support member 152 together comprise one sensor coil. The third support member 154 comprises a second sensor coil. Both sensor coils are similar to the sensor coil 94, 96 described above with reference to FIG. 4. The first and second support members 150 and 152 act as a spring to bias the known proof mass 156 against the spring action of the third support member 154. The support members 150, 152, and 154 cooperate to suspend the mass within housing 158.

The fixed mandrels 160, 164 are positioned within the housing 158 to produce a predetermined initial bias in each of the elastic support members 150, 152, 154. Support members 150, 152, 154 are axially aligned with each other in the direction indicated by arrow 168. Fixed mandrels 160, 164 and mandrel ends 162, 166 include grooves 170 positioned thereon to facilitate assembly and maintain the axial positioning of the support members 150, 152, and 154. Accelerometer 22 accurately detects acceleration in the axial direction 168 as will be more fully explained herein below.

Mass 156 is comprised of central portion 171 between mandrel ends 162, 166. However, embodiments of the present invention may include those wherein a single cylindrical floating mandrel comprises the total mass with both interferometers wound therearound. Mass 156 of accelerometer 22 further includes alignment assemblies 172, 174 as best shown in the exploded view of FIG. 7. The alignment assemblies 172 and 174 limit the movement of mass 156 perpendicularly to the axial direction 168. Alignment assemblies 172, 174 are comprised of alignment rods 176, 178 that slidably pass through holes 180, 182 in mandrel ends 162, 166 respectively and that are attached to diaphragms 184, 186 by threaded nuts 188, 190, for example.

Diaphragms 184, 186 are captured within bores 192, 194 in housing 158 by end plates 196, 198 installed on the ends of the housing by screws (not shown), for example. Boss elements 200 on the end plates 196, 198 cooperate with lips 202 within the bores 192, 194 to capture the diaphragms 184, 186 about their outer edges within the bore and to allow for flexure of the diaphragms in the axial direction 168. Diaphragms 184, 186 are comprised of a thin flexible material, such as metal for example, which provides for a highly flexible member along the axial direction 168 but is quite rigid in the plane of the diaphragms (perpendicular to the axial direction). This allows relatively unimpeded movement of mass 156 in the axial direction 168 while virtually eliminating movement of the mass assembly in non-axial directions.

By limiting the movement of the mass 156 in non-axial directions, alignment assemblies 172, 174 of accelerometer 22 greatly reduce cross-axis response. Alternative embodiments of the alignment assemblies may include the holes 180, 182 cooperating with the alignment rods 176, 178 in a close tolerance arrangement and precluding the need for diaphragms 184, 186. In this particular embodiment, the alignment rods 176, 178 limit movement of the mass 156 in non-axial direction by interference with the walls of the holes 180, 182.

In operation, accelerometer 22 may be mounted to a structure, such as the oil production tube 10 of FIG. 2, for example, by rigid attachment of housing 158 by any method such as bolting, welding, or other known methods. As the structure experiences acceleration due to changes in movement, in direction or in relative velocity; the mass 156 shifts in the axial direction 168 within housing 158. The mass 156 shifts with a magnitude proportional to the acceleration of the structure in the axial direction 168.

Elastic support members 150, 152, and 154 respond by elongating or relaxing. The action of the elastic support members 150, 152 154 lengthens or shortens the optical fibers and produces a signal corresponding to the acceleration. For example, when the structure, or housing 158 thereby, is accelerated in the direction indicated by arrow 210, the mass 156 is displaced within the housing 158 in the opposite direction indicated by arrow 211. In this particular case, the tension in the third support member 154 increases, and the fiber length therein therefore increases. The tension in the first and second support members 150 and 152 decreases, and the fiber length therein decreases.

Figure 8:
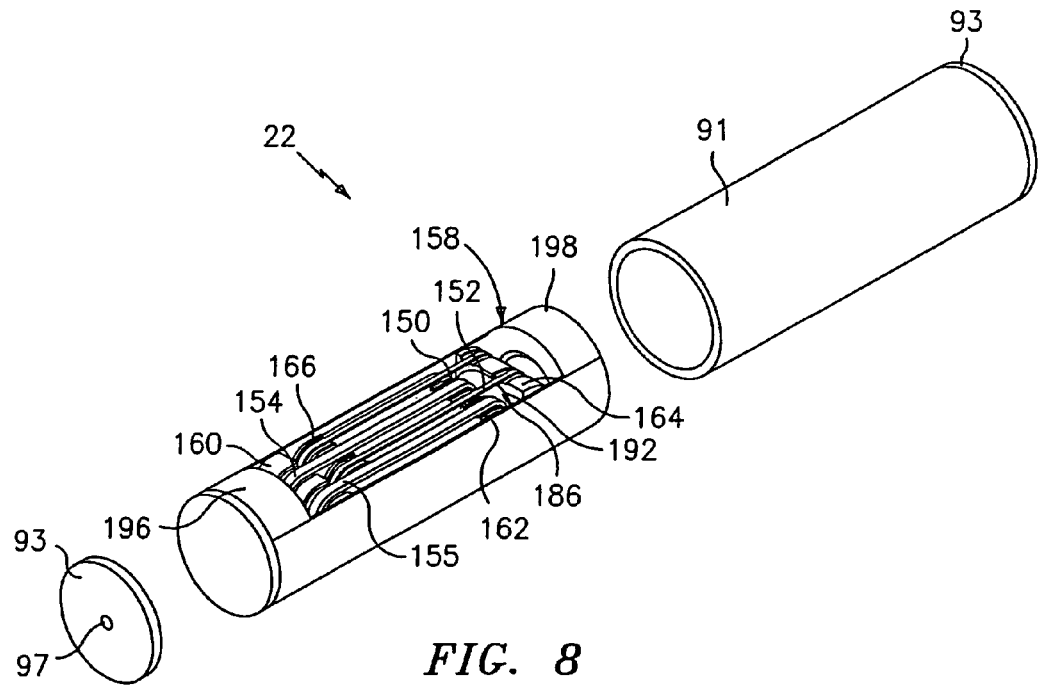
FIG. 8 is a perspective view of another embodiment of an accelerometer of the present invention.

Similarly, when the structure, or housing 158 thereby, is accelerated in the direction indicated by arrow 211, the mass 156 is displaced within the housing 158 in the opposite direction indicated by arrow 210 (see FIG. 8). In this particular case, the tension in the first and second support members 150 and 152 increases, and the fiber length therein therefore increases. The tension in the third support member 154 decreases, and the fiber length therein decreases.

The change in phase angle of the light within the fibers as interpreted by the processing equipment 35 of FIG. 2 caused by the change in length of the fibers corresponds to a known acceleration level as described above. The support members 150, 152, and 154 are independent coil systems. Their output can be manipulated accordingly in a known manner, such as by a differential method, or may be manipulated in an independent mode, such as a single coil in a sensor leg of an interferometer.

Other methods of determining a corresponding change in length of the support members 150, 152, and 154 are included in the present invention and will be more fully described herein below. In an alternative embodiment, only one of the interferometers, either the one comprised by the third support member 154 or the one comprised by the first and second support members 150 and 152, is used for outputting a signal responsive to the acceleration of the accelerometer 22.

Figure 9:
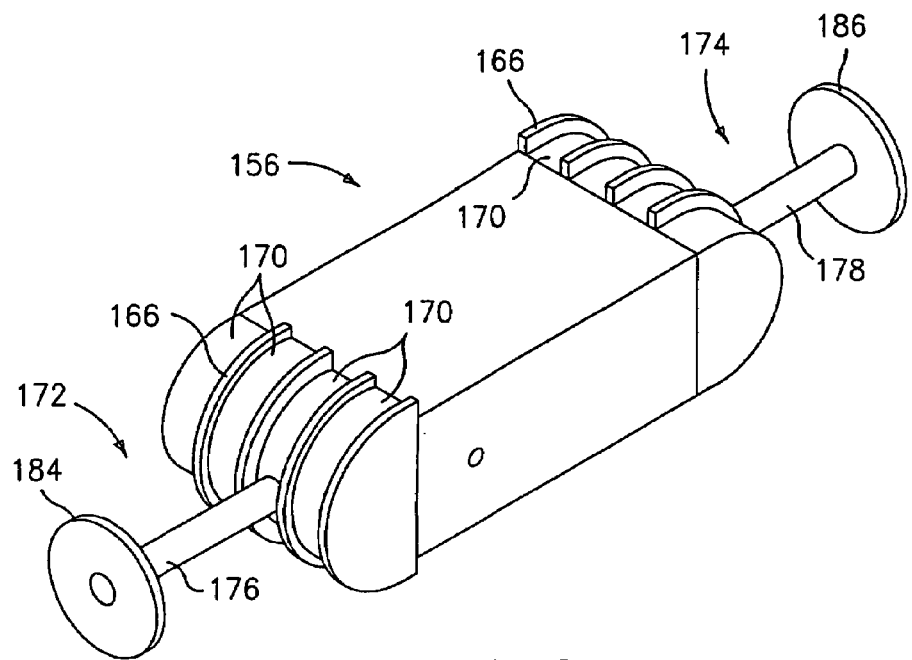
FIG. 9 is a perspective view of the mass and axial alignment assemblies of the accelerometer of FIG. 8.

Referring to FIGS. 8 and 9, another embodiment of accelerometer 22 as described above is illustrated. In FIG. 8, a perspective view of the accelerometer 22 is illustrated partially exposed. In FIG. 9, a perspective view of a mass 156 of the accelerometer 22 is illustrated in isolation.

The accelerometer 22 includes a first pair of elastic support members 150, 152 and includes a second pair of elastic support members 154, 155. The elastic support members 150, 152, 154, and 155 are comprised of windings of optical fibers, although other elastic support members could be employed without deviating from the present invention. The first pair of elastic support members 150 and 152 is comprised of the same length of fiber as the second pair of elastic support members 154, 155.

The first and second pairs of elastic support members cooperate in a push-pull arrangement to suspend mass 156 within a housing 158. The wraps of supports 154, 155 are wound in a continuous fashion about a fixed mandrel 160 rigidly attached to housing 158 and a mandrel end 162 of mass 156. Similarly, the wraps of support members 150, 152 are wound in a continuous fashion about a fixed mandrel 164 rigidly attached to housing 158 and a mandrel end 166 of mass 156.

Each of the support members 150, 152, 154, 155 comprise a sensor coil for use in an interferometer, with all being similar to the sensor coils 94 and 96 described above with reference to FIGS. 4 and 5. Support members 150, 152 act as a spring to bias mass 156 against the spring action of support members 154, 155 and cooperate to suspend the mass 156 within housing 158. The fixed mandrels 160, 162 are initially positioned within the housing 158 to produce a predetermined initial bias in each of the elastic support members 150, 152, 154, 155.

In the direction indicated by arrow 168, support members 150, 152, 154, and 155 are axially aligned with each other, the housing 158, and the mass 156. As best shown in FIG. 9, fixed mandrels 160, 164 and mandrel ends 162, 166 include grooves 170 positioned thereon to facilitate assembly and maintain the axial positioning of the support members. Accelerometer 22 accurately detects acceleration in the axial direction 168 as will be more fully explained herein below.

As shown in FIG. 8, accelerometer 22 is small enough to fit within a 0.75 diameter tube 91 having end caps 93 for use in sealing and protecting the device from the environment. In one embodiment, tube 91 is comprised of Inconel material and has outside dimensions of approximately 1-inch in diameter and approximately 3.5 inches in length. At least one of the end caps 93 further includes an exit hole 97 including any known sealing feature for routing a transmission cable 28 (not shown) from the housing 158.

The diameters of the mandrels are approximately 11-mm to 13-mm, and the distance between fixed mandrels 160, 164 and floating mandrels 162, 166 respectively is about 44 mm in a 0.0 g state. Mass 156 is comprised of a metallic material and is approximately 60-grams. Support members 150, 152, 154, 155 are comprised of an 80-micron optical fiber. A total length of between about 10-m and about 20-m is used with the number of wraps varying from about 39 to about 105. The housing 158, the mass 156, and the mandrels may all be comprised of metal materials. In embodiments where the support members 150, 152, 154, and 155 are comprised of optical fibers, the use of an all-metal configuration with the glass fibers yields an extremely stable and reliable accelerometer 22 even at elevated temperatures.

As best shown in FIG. 9, mass 156 includes cylindrically shaped mandrel ends 162, 166. However, embodiments of the present invention may include those wherein a single cylindrical floating mandrel comprises the total mass and around which both sensor coils are wound. Mass 156 of accelerometer 22 further includes alignment assemblies 172, 174 for limiting the movement of mass 156 perpendicular to the axial direction 168. Alignment assemblies 172, 174 are comprised of alignment rods 176, 178 respectively and are attached to diaphragms 184, 186 by welding or gluing, for example.

Diaphragms 184, 186 are captured within bores (not shown) in housing 158 about their outer edges to allow for flexure of the diaphragms in the axial direction 168. Diaphragms 184, 186 are comprised of a thin flexible material, such as metal for example, which provides for a highly flexible member along the axial direction 168 but is quite rigid in the plane of the diaphragms (perpendicular to the axial direction). This allows relatively unimpeded movement of mass 156 in the axial direction 168 while virtually eliminating movement of the mass assembly in non-axial directions. By limiting the movement of the mass 156 in non-axial directions, alignment assemblies 172, 174 of accelerometer 22 greatly reduce cross-axis response.

In operation, accelerometer 22 may be mounted to a structure, such as the oil well casing or the oil production tube 10 of FIG. 2, for example, by rigid attachment of housing 158 by any method, such as bolting, welding or other known methods. As the structure experiences acceleration due to changes in movement, direction, or relative velocity; mass 156 shifts in the axial direction 168 within housing 158. The mass 156 shifts with a magnitude proportional to the acceleration of the structure in the axial direction. Elastic support members 150, 152 154, 155 respond by elongating or relaxing. The action of the elastic support members 150, 152 154, 155 lengthens or shortens the optical fibers and produces a signal corresponding to the acceleration.

For example, when the structure, or housing 158 thereby, is accelerated in the direction indicated by arrow 210, mass 156 is displaced within the housing in the opposite direction indicated by arrow 211. In this particular case, the tension in support members 154, 155 increases, and the fiber length therein therefore increases. The tension in support members 150, 152 decreases, and the fiber length therein decreases. Similarly, when the structure, or housing 158 thereby, is accelerated in the direction indicated by arrow 211, mass 156 is displaced within the housing in the opposite direction indicated by arrow 210. In this particular case, the tension in support members 150, 152 increases, and the fiber length therein therefore increases. The tension in support members 154, 155 decreases, and the fiber length therein decreases.

Figure 10:
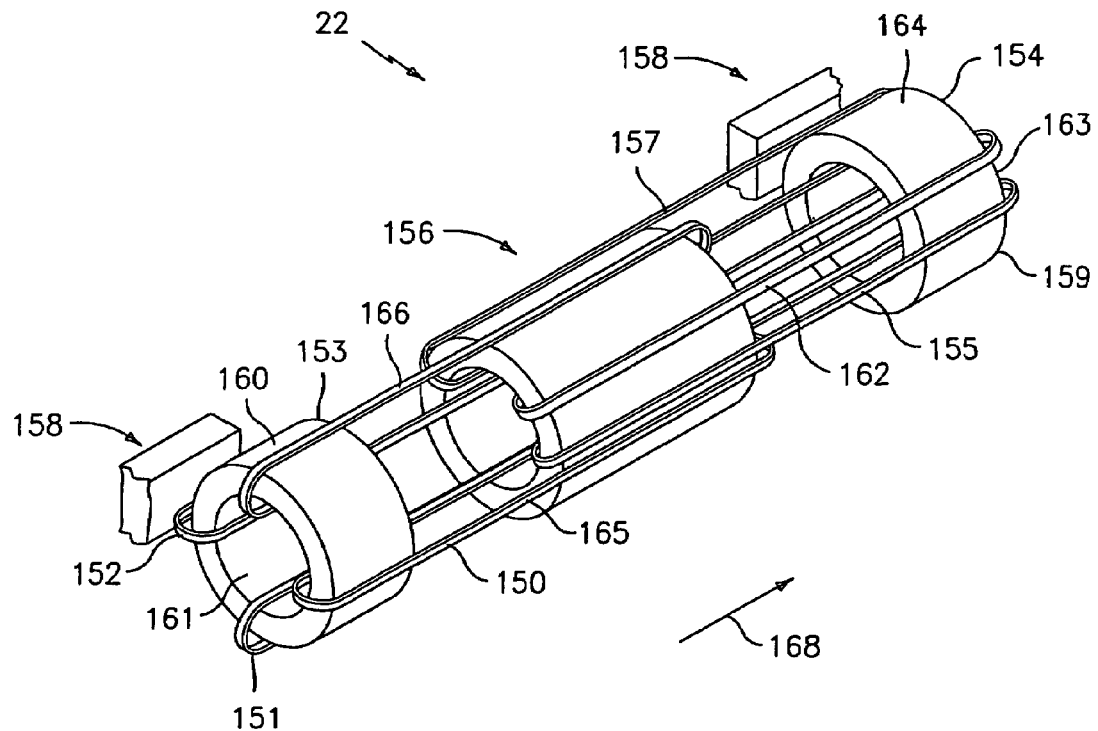
FIG. 10 is a perspective view of an embodiment of the accelerometer of the present invention comprised of toroidal shaped members.

Referring to FIG. 10, yet another embodiment of the present invention is illustrated in a perspective view. In the present embodiment, fixed mandrels 160, 164 are both in the form of a torus having an internal bore 161, 163 in the axial direction 168. Mass 156 is in the form of an elongated torus having a bore 165 in the axial direction. Fixed mandrels 160, 164 are attached to a housing partially represented by 158 according to any known method such as those described above.

In accordance with the present invention and as described above, four pairs of elastic support members 150, 151, 152, 153 bias mass 156 toward fixed mandrel 160. Four pairs of elastic support members 154, 155, 157, 159 bias mass 156 toward fixed mandrel 164. Although the embodiment in FIG. 10 is shown with reference to four pairs of supports members, the present invention may include more pairs. In addition, although shown as a torus, the mass 156 and fixed mandrels 160 and 164 may comprise any shape that permits placement of support members in a 360-degree distributed fashion about the mandrels and mass.

Elastic support members 150, 151, 152, 153 are comprised of the same length of fiber as elastic support members 154, 155, 157, 159 and cooperate in a push-pull arrangement to suspend mass 156 within housing 158. The wraps of supports 154, 155, 157, 159 are wound in a continuous fashion about fixed mandrel 160 through bore 161 and about the mandrel end 162 of mass 156 through bore 165. Similarly, the wraps of support members 154, 155, 157, 159 are wound in a continuous fashion about fixed mandrel 164 through bore 163 and about the mandrel end 166 of mass 156 through bore 165.

Each of the support members may comprise a coil for use in an interferometer with all being similar to sensor coils 94, 96 described above with reference to FIGS. 4 and 5. Support members 150, 151, 152, 153 act as a spring to bias mass 156 against the spring action of support members 154, 155, 157, 159 and cooperate to suspend the mass within housing 158. The fixed mandrels 160, 162 are initially positioned within the housing 158 to produce a predetermined initial bias in each of the elastic support members. In the direction indicated by arrow 168, support members 150–159 are axially aligned with each other, the housing 158 and the mass 156 and are preferably evenly distributed in the radial direction.

Figure 11:
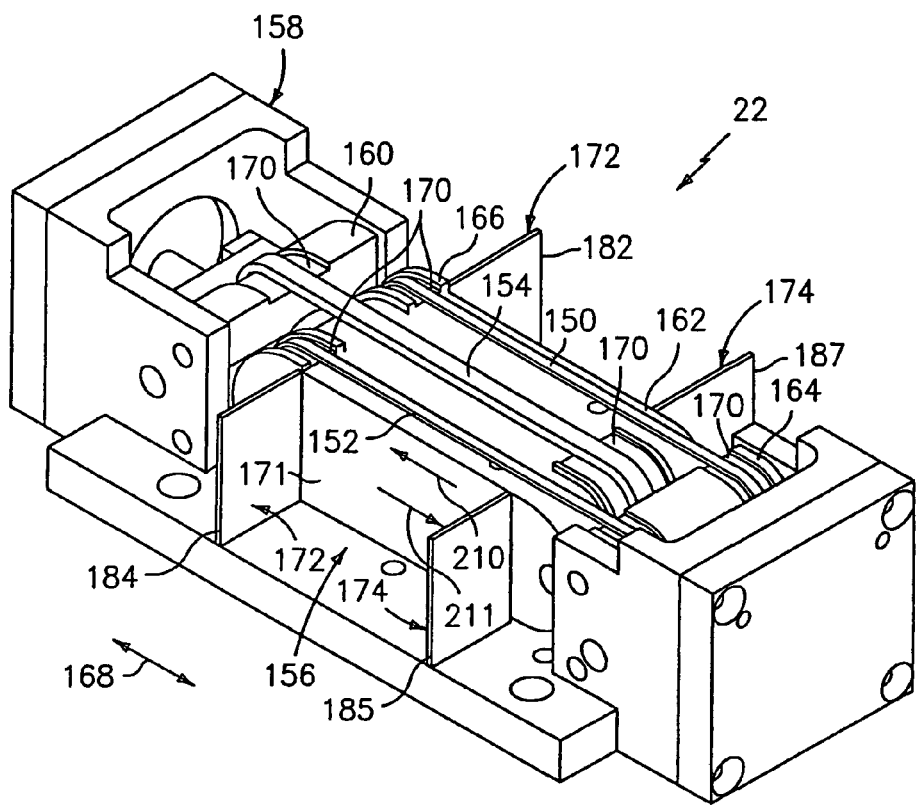
FIG. 11 is a perspective view of an embodiment of the accelerometer of FIG. 6 having an alternative axial alignment assembly.

Referring to FIG. 11, an embodiment of an accelerometer 22 is illustrated having an alternative embodiment of axial alignment assemblies 172, 174. In the present embodiment, the accelerometer 22 is substantially similar to that discussed above with reference to FIGS. 6 and 7. In the present embodiment, however, the axial alignment assemblies 172, 174 comprise flexure members. The flexure members 182, 184, 185, and 187 are attached to the mass 156 and the housing 158 near their outboard ends by, for example, welding or gluing. The attachment allows for flexure of the flexure members 182, 184, 185, and 187 in the axial direction 168.

Flexure members 182, 184, 185, and 187 are comprised of a thin flexible material, such as metal for example, which provides for a highly flexible member along the axial direction 168 but is quite rigid in the plane of the flexure members (perpendicular to the axial direction). This allows relatively unimpeded movement of mass 156 in the axial direction 168 while virtually eliminating movement of the mass assembly in non-axial directions. By limiting the movement of the mass 156 in non-axial directions, alignment assemblies 172, 174 of accelerometer 22 greatly reduce cross-axis response.

Referring to FIG. 12, an example of the performance of the accelerometers of the present invention is shown. A plot of the relative response of the accelerometer of FIG. 8 to an excitation force on a calibration test shaker is illustrated. The set up of the test shaker is known in the industry and is comprised of standard input and output components, as well as a known reference accelerometer. The specific accelerometer 22 is designed to operate with a bandwidth from about 5 Hz up to about 500 Hz. During testing, accelerometer 22 of the present invention was subjected to a test signal of approximately 126 µg in the axial direction 168 at a frequency of 25 Hz.

Line 101 represents the performance of accelerometer 22 when the axial direction 168 of the accelerometer is parallel to the z-axis, as represented by arrow 34 in FIG. 1. Line 101 shows an extremely sensitive 65 dB signal to noise ratio response represented by point 104 at the 25 Hz test signal frequency. Very little spurious response is seen on either side of the test signal. Similarly, line 103 represents the performance of accelerometer 22 when the axial direction 168 and the test force are parallel to the x-axis, as represented by arrow 30 in FIG. 1. Line 103 shows an almost exact level of response at the test signal frequency of 25 Hz.

In addition, the orientation of the accelerometer does not adversely affect the relatively low spurious signals on either side of the test signal. The relatively low noise is further demonstrated in the figure with the largest of such peaks being less than 28 dB at 60 Hz. The 60 Hz signal is due to ground loops in the calibration system and is not considered an accelerometer error signal. Such signals, once their cause is identified, can in most instances be isolated and eliminated. It is a beneficial feature of the present invention that the orientation of the accelerometer with respect to gravity has little effect on its performance. Therefore, arrays of accelerometers 22 in the three orthogonal directions 30, 32, 34 (discussed with respect to FIG. 2) can be used to measure the vector directions of seismic detected waves.

Referring to FIGS. 13 and 14, the bandwidth of the accelerometer is shown. The accelerometer was tested as described herein above with reference to FIG. 12, and the phase response was checked against the reference accelerometer. The amplitude response was checked relative to the reference accelerometer for a frequency range up to about 500 Hz. The phase response represented by line 105 in FIG. 13 is relatively flat, which demonstrates that the accelerometer 22 is operating well away from the resonant frequency of the device.

Line 105 further shows the accelerometer lacks spurious signals within the bandwidth that could otherwise result in errors within the desired operating bandwidth. Likewise, the relative amplitude response represented by line 107 in FIG. 14 is relatively flat and free of spurious signals. This further demonstrates that the accelerometer 22 is operating well away from the resonant frequency of the device and behaves predictably in the frequency range of 5 Hz to 500 Hz.

In an embodiment of the present invention that utilizes fiber optics as the elastic support members, they may be connected individually or may be multiplexed along one or more optical fibers using wavelength division multiplexing (WDM), time division multiplexing (TDM), or any other optical multiplexing techniques (discussed more hereinafter).

Figure 15:
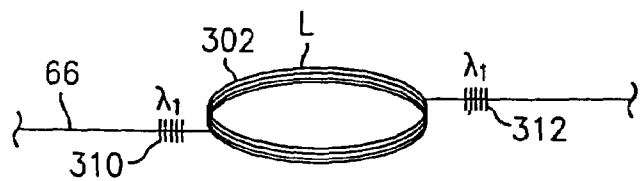
FIG. 15 is a side view of an elastic support member comprising an optical fiber wrap having a pair of Bragg gratings around each optical wrap in accordance with the present invention.

Referring to FIG. 15, the support member for an accelerometer of the present invention may comprise a wrap 302 of fiber 66 having a pair of gratings 310, 312 on opposite ends of the wrap 302. The wrap 302 with the gratings 310, 312 may be configured in numerous known ways to precisely measure the fiber length L or the change in fiber length ΔL, such as by interferometric arrangement, a Fabry Perot arrangement, by an assessment of time-of-flight, or other known arrangements.

An example of a Fabry Perot measurement technique is described in U.S. Pat. No. 4,950,883, entitled "Fiber Optic Sensor Arrangement Having Reflective Gratings Responsive to Particular Wavelengths," and issued in the name of Glenn. One example of time-of-flight (or Time-Division-Multiplexing; TDM) is where an optical pulse having a wavelength is launched down the fiber 66 and a series of optical pulses are reflected back along the fiber 66. At any point in time, the length of each wrap can be determined by the time delay between each return pulse and the related acceleration of the mass 156 (FIG. 8) thereby.

Alternatively, a portion or all of the fiber between the gratings (or including the gratings, or the entire fiber, if desired) may be doped with a rare earth dopant (such as erbium) to create a tunable fiber laser such as is described in U.S. Pat. Nos. 5,317,576, entitled "Continuously Tunable Single Mode Rare-Earth Doped Laser Arrangement"; U.S. Pat No. 5,513,913, entitled "Active Multipoint Fiber Laser Sensor"; or U.S. Pat No. 5,564,832, entitled "Birefringent Active Fiber Laser Sensor," all of which issued in the name of Ball et al., and all of which are incorporated herein by reference.

Figure 19:
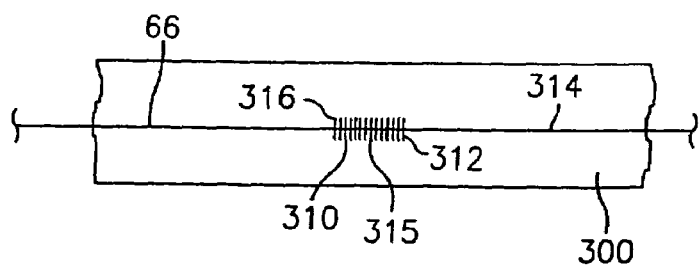
FIG. 19 is a top view in partial section of an alternative geometry of an elastic support member having an optical fiber with a pair of Bragg gratings in accordance with the present invention.

Referring to FIG. 19, another type of tunable fiber laser that may be used in an accelerometer of the present invention is a tunable distributed feedback (DFB) fiber laser, such as those described in V. C. Lauridsen et al., "Design of DFB Fibre Lasers," Electronic Letters, Oct. 15, 1998, Vol. 34, No. 21, pp 2028–2030; P. Varming et al., "Erbium Doped Fiber DGB Laser With Permanent π/2 Phase-Shift Induced by UV Post-Processing," IOOC '95, Tech. Digest, Vol. 5, PD1–3, 1995; U.S. Pat. No. 5,771,251, entitled "Optical Fibre Distributed Feedback Laser," and issued in the name of Kringlebotn et al.; or U.S. Pat. No. 5,511,083, entitled "Polarized Fiber Laser Source," and issued in the name of D'Amato et al.

Figure 18:
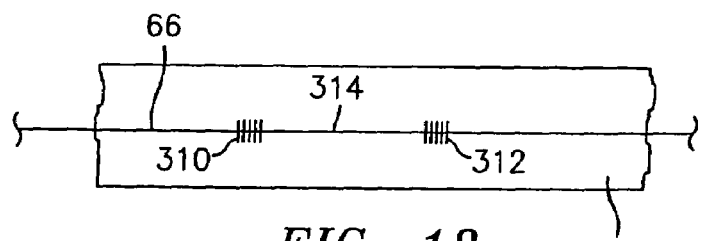
FIG. 18 is a top view in partial section of an elastic support member having an optical fiber with a pair of Bragg gratings in accordance with the present invention.

In FIG. 19, a grating 316 is written in a rare-earth doped fiber 66 and is configured to have a phase shift of $\lambda/2$ (where $\lambda$ is the lasing wavelength) at a predetermined location 315 near the center of the grating 316. This provides a well-defined resonance condition that may be continuously tuned in single longitudinal mode operation without mode hopping, as is known. Alternatively, and as shown in FIG. 18, instead of a single grating, the two gratings 310, 312 may be placed close enough to form a cavity having a length of $(N+\frac{1}{2})\lambda$, where N is an integer (including 0) and the gratings 310, 312 are formed in a rare-earth doped fiber.

Figure 16:
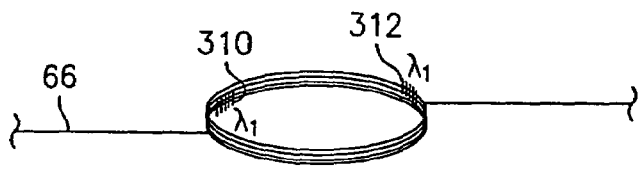
FIG. 16 is a side view of an optical fiber wrap with a pair Bragg gratings within the wrap in accordance with the present invention.

Referring to FIG. 16, instead of positioning the gratings 310, 312 outside the wrap 302, they may be placed along the wrap 302. The grating reflection wavelength may vary with acceleration changes. Such variation may be desired for certain configurations, e.g., fiber lasers. Such variation may be compensated for in the optical signal instrumentation 35 (FIG. 1) for other configurations, e.g., by allowing for a predetermined range in reflection wavelength shift for each pair of gratings. Alternatively, instead of each of the wraps being connected in series, they may be connected in parallel, e.g., by using optical couplers (not shown) prior to each of the wraps, each coupled to the common fiber 66.

Figure 17:
FIG. 17 is a side view of an optical fiber wrap interferometer in accordance with the present invention.

Referring to FIG. 17, alternatively, the accelerometer 22 may also be formed as a purely interferometric sensor by wrapping the mandrels (for example 86, 88, 90, and 92 of FIG. 4) with the wrap 302 without using Bragg gratings where each wrap has a separate fiber 66. In this particular embodiment, known interferometric techniques may be used to determine the length or the change in length of the fiber 66 between the mandrels due to movement of the mass 156 (see, e.g., FIG. 8). For example, Mach Zehnder or Michelson Interferometric techniques can be used, such as those described in U.S. Pat. No. 5,218,197, entitled "Method and Apparatus for the Non-invasive Measurement of Pressure Inside Pipes Using a Fiber Optic Interferometer Sensor," and issued in the name of Carroll.

The interferometric wraps may be multiplexed such as is described in Dandridge et al., "Fiber Optic Sensors for Navy Applications," IEEE, February 1991, or Dandridge et al., "Multiplexed interferometric Fiber Sensor Arrays," SPIE, Vol. 1586, 1991, pp. 176–183. Other techniques to determine the change in fiber length may be used. In addition, reference optical coils (not shown) may be used for certain interferometric approaches. The reference optical coils may also be located in or around the accelerometer 22, but may be designed to be insensitive to axial accelerations.

Also, for any geometry of the wraps described herein, more than one layer of fiber may be used depending on the overall fiber length desired. It is further within the scope of the present invention that the wrap 302 may comprise the optical fiber 66 disposed in a helical pattern (not shown) about the mandrels. Other geometries for the wraps may be used if desired. The desired axial length of any particular wrap is set depending on the characteristics of the ac sensitivity and other parameters desired to be measured, for example, the magnitude of the acceleration.

Referring to FIGS. 18 and 19, embodiments of the present invention include configurations where, instead of using the wrap 302, the fiber 66 may be disposed on or within an elastic member 300. The fiber 66 may have shorter sections 314 that are disposed on the elastic support member 300 that optically detect strain in the member 300. The orientation of the strain-sensing element will vary the sensitivity to strain on the member 300 caused by acceleration.

Figure 20:
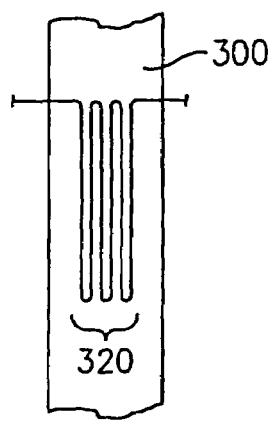
FIG. 20 is a top view in partial section of an elastic support member having an alternative geometry optical fiber in the form of a radiator coil.
Figure 21:
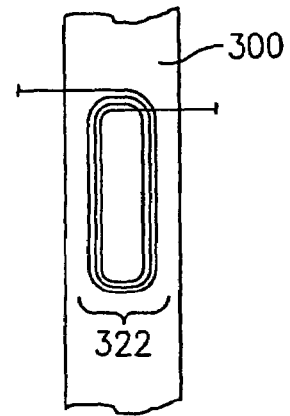
FIG. 21 is a top view in partial section of an elastic support member having an alternative geometry optical fiber in the form of a race track.

Referring to FIGS. 20 and 21, the optical strain sensor 320, 322 on the support member 300 may have a longer length with various alternative geometries, such as a "radiator coil" geometry 320 in FIG. 20 or a "race-track" geometry 322 in FIG. 21. The alternative geometries 320 and 322 may be disposed along the support member 300 to measure strain. In this particular embodiment, the length is set long enough to optically detect the changes to the strain on the elastic member 300 caused by acceleration as described above.

Referring in particular to FIG. 18, the pairs of Bragg gratings 310 and 312 may be located along the fiber 66 with at least a section 314 of the fiber 66 between each of the grating pairs being located on the elastic members 300. Known Fabry Perot, interferometric, time-of-flight, or fiber laser sensing techniques may be used to measure the change in length of at least a section of the elastic support member 300, in a manner similar to that described in the aforementioned references.

In FIG. 18, alternatively, the gratings 310 and 312 may be individually disposed on the support member 300 and may be used to sense the strain on the member 300 (and thus displacement of the mass 156). When a single grating is used on the support member 300, the grating reflection wavelength shift is indicative of changes in strain on the member 300.

Any other technique or configuration for an optical strain gauge may be used. The type of optical strain gauge technique and optical signal analysis approach is not critical to the present invention, and the scope of the invention is not intended to be limited to any particular technique or approach.

For any of the embodiments described herein, the strain sensors, including electrical strain gauges, optical fibers, and/or gratings among others as described herein, may be attached to the elastic support members by adhesive, glue, epoxy, tape, or other suitable attachment means to ensure suitable contact between the strain sensor and the elastic member. The strain gauges, optical fibers, or sensors may alternatively be removable or permanently attached via known mechanical techniques, such as by a mechanical fastener arrangement, a spring loaded arrangement, a clamped arrangement, a clamshell arrangement, a strapping arrangement, or other equivalents. Alternatively, the strain gauges, including optical fibers and/or gratings, may be embedded in the elastic members. In addition, for any of the embodiments described herein, the support member may also comprise any strain sensitive material, such as a PVDF.

Figure 22:
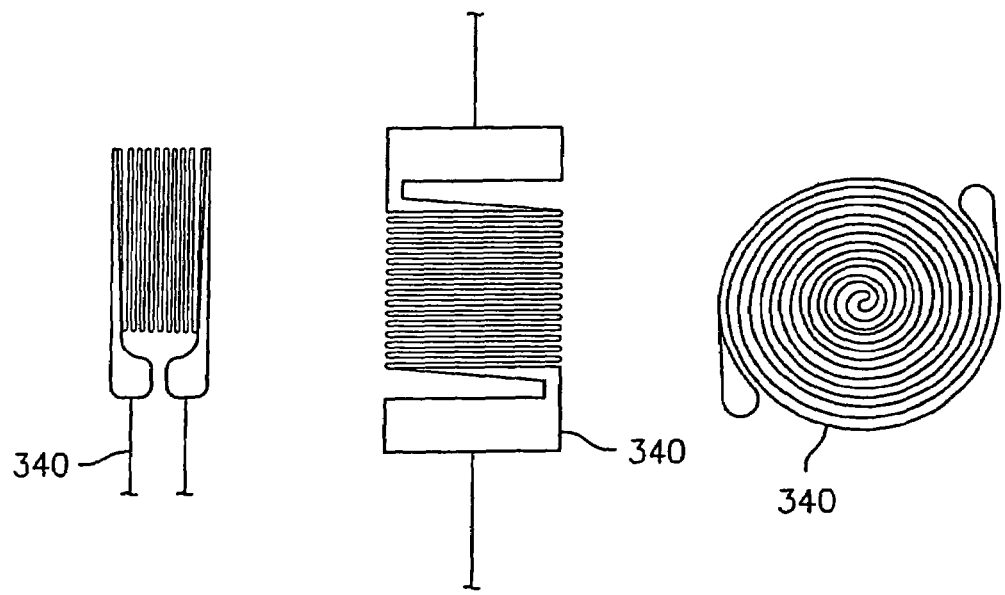
FIG. 22 is a top view of three alternative strain gauges in accordance with the present invention.
Figure 23:
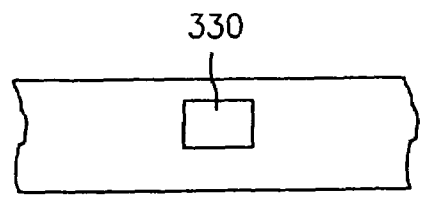
FIG. 23 is a top view in partial section of an elastic support member showing a strain gauge.

Referring to FIGS. 22 and 23, it is also within the scope of the present invention that any other strain sensing technique may be used to measure the variations in strain on the elastic member. For example, highly sensitive piezoelectric, electronic, or electric strain gauges may be attached to or embedded in the elastic support members. Referring to FIG. 22, different known configurations of highly sensitive piezoelectric strain gauges are shown and may comprise foil type gauges 340. Referring to FIG. 23, an embodiment of the present invention is shown wherein the strain sensors comprise strain gauges 330. In this particular embodiment, strain gauges 330 are disposed about a predetermined portion of the elastic member 300.

It should be understood that any of the embodiments described herein may comprise elastic support members in the form of discrete strips of material that are merely attached to the housing 158 and the mass 156 by any known method. It should be further understood that although description of the embodiments has been given with reference to the mass 156 moving, it is within the scope of the present invention that the housing 158 may move and the mass remain stationary, the relative motion between the two features being detected by the change in length of the support member.

It should be understood that, unless otherwise stated herein, any of the features, characteristics, alternatives, or modifications described regarding a particular embodiment herein may also be applied, used, or incorporated with any other embodiment described herein. In addition, it should be noted that the Figures are not drawn to scale.

Although the invention has been described and illustrated with respect to exemplary embodiments thereof, the foregoing and various other additions and omissions may be made therein and thereto without departing from the spirit and scope of the present invention.

What is claimed is:

1. A system for seismic profiling of the earth, comprising:
an array of optical based accelerometers, each of the accelerometers comprising:
a rigid frame;
a mass movably suspended on the rigid frame; and
a sensing coil comprising multiple wraps of an optical fiber wrapped around surfaces of first and second elements to provide a sensing light signal based on a change in length of the sensing coil due to movement of the mass in response to vibrations traveling in the earth, wherein the first element does not move relative to the rigid frame and the second element moves with the mass; and
signal processing equipment configured to provide seismic profile information based on respective sensing light signals received from the army of optical based accelerometers.

2. The system of claim 1, further comprising an optical transmission cable having the optical based accelerometers disposed along a length thereof.

3. The system of claim 1, wherein the sensing coil comprises multiple wraps of an optical fiber separating reflective elements to enable interferometric sensing of the change in length.

4. The system of claim 1, wherein the army of optical based accelerometers are coupled to a member within a bore hole.

5. The system of claim 1, wherein each of the accelerometers operates at a different wavelength band and central wavelength such that the respective sensing light signals are detected using wavelength division multiplexing.

6. The system of claim 1, wherein the mass comprises a torus.

7. The system of claim 1, wherein the mass is movable in substantially only a single axis.

8. The system of claim 1, further comprising an acoustic wave source.

9. The system of claim 1, wherein the array of optical based accelerometers are coupled to production pipe within a bore hole.

10. The system of claim 1, wherein the army of optical based accelerometers are disposed in a bore hole and the signal processing equipment is located at a surface of the earth.

11. A method of seismic profiling of the earth, comprising:
energizing the earth to cause acoustic waves to radiate therethrough;
detecting the acoustic waves with an array of optical based accelerometers disposed along a length of an optical transmission cable, each of the accelerometers comprising:
a rigid frame;
a mass movably suspended on the rigid frame; and
a sensing coil wrapped around surfaces of first and second elements to provide a sensing light signal based on a change in length of the sensing coil due to movement of the mass in response to vibrations traveling in the earth, wherein the first element does not move relative to the rigid frame and the second element moves with the mass; and
processing respective sensing light signals received from the array of optical based accelerometers to provide seismic profile information.

12. The method of claim 11, further comprising disposing the array of optical based accelerometers within a bore hole.

13. The method of claim 12, further comprising repositioning the array of optical based accelerometers within the bore hole and repeating.

14. The method of claim 11, wherein processing the respective sensing light signals includes interferometric sensing of the change in length of the sensing coil which comprises multiple wraps of an optical fiber.

15. The method of claim 11, wherein processing the respective sensing light signals includes interferometric sensing of the change in length of the sensing coil which comprises multiple wraps of an optical fiber separating reflective elements.

16. The method of claim 11, wherein processing the respective sensing light signals includes using wavelength division multiplexing to interpret the sensing light signals from each of the accelerometers that operate at different wavelength bands and central wavelengths.

17. The method of claim 11, wherein the mass comprises a torus.

18. The method of claim 11, wherein cross-axis motion of the mass is substantially prevented.

19. The method of claim 11, wherein energizing the earth comprises detonating a charge in a shothole.

20. A system for seismic profiling of the earth, comprising:
- an optical transmission cable;
- an array of optical based accelerometers disposed along the optical transmission cable, each of the accelerometers comprising:
  - a rigid frame;
  - a mass movably suspended on the rigid frame; and
  - a sensing coil comprising multiple wraps of an optical fiber to provide a sensing light signal based on a change in length of the sensing coil due to movement of the mass in response to vibrations traveling in the earth;
- a signal converter coupled to the optical transmission cable to interpret wavelength phase change from respective sensing light signals received from the array of optical based accelerometers; and
- signal processing equipment coupled to the signal converter to provide seismic profile information based on interpreted wavelength phase changes.

* * * * *